(12) United States Patent
Abrigo et al.

(10) Patent No.: US 8,087,917 B2
(45) Date of Patent: Jan. 3, 2012

(54) PLANT FOR CONTINUOUSLY MANUFACTURING A FOAM LAYER TO FORM REST ARTICLES

(75) Inventors: Luciano Abrigo, Alessandria (IT);
Pasquale De Michele, Novi Ligure (IT);
Renzo Villa, Cassano d'Adda (IT)

(73) Assignee: Sapsa Bedding SRL, Milan (IT)

( * ) Notice: Subject to any disclaimer, the term of this patent is extended or adjusted under 35 U.S.C. 154(b) by 355 days.

(21) Appl. No.: 12/180,847

(22) Filed: Jul. 28, 2008

(65) Prior Publication Data

US 2009/0155402 A1    Jun. 18, 2009

(30) Foreign Application Priority Data

Dec. 18, 2007   (IT) ............................... MI2007A2356

(51) Int. Cl.
*B29C 44/20* (2006.01)
(52) U.S. Cl. ........ 425/4 C; 425/115; 425/370; 425/385; 425/387.1; 425/817 C; 264/45.8; 264/157; 264/273; 264/293; 264/321
(58) Field of Classification Search .................. 425/4 C, 425/51, 185, 220, 453, 817 C, 223, 224, 115, 425/308, 369, 370, 385, 387.1; 264/45.8, 264/51, 293, 157, 273, 313, 321, 334
See application file for complete search history.

(56) References Cited

U.S. PATENT DOCUMENTS

| | | | | |
|---|---|---|---|---|
| 2,365,804 A | * | 12/1944 | Clerke | 425/357 |
| 2,395,920 A | * | 3/1946 | Te Grotenhuis | 264/415 |
| 2,757,415 A | * | 8/1956 | Mathues et al. | 264/213 |
| 3,076,226 A | | 2/1963 | Borton et al. | |
| 3,736,081 A | * | 5/1973 | Yovanovich | 425/4 C |
| 3,800,018 A | * | 3/1974 | Charpentier | 264/53 |
| 4,035,126 A | * | 7/1977 | Manning | 425/157 |
| 4,357,373 A | * | 11/1982 | Cooper | 427/358 |
| 5,035,846 A | * | 7/1991 | Carotti | 264/48 |
| 5,229,138 A | * | 7/1993 | Carotti | 425/4 C |

(Continued)

FOREIGN PATENT DOCUMENTS

EP     0380963 A1    8/1990

(Continued)

OTHER PUBLICATIONS

European Search Report, EP application No. EP08013042, Oct. 21, 2010.

*Primary Examiner* — Joseph Del Sole
*Assistant Examiner* — Seyed Masoud Malekzadeh
(74) *Attorney, Agent, or Firm* — Novak Druce + Quigg, LLP

(57) ABSTRACT

A plant for manufacturing a continuous latex foam layer (2) to form mattresses (6) provided with cells (5). The plant comprises a plurality of laying planes (7) provided with a plurality of separate tables (13) separately arranged side by side to form a surface for the foam deposit.

Each table comprises protuberances (14) and the arrangement of the protuberances on a table can differ from that of the juxtaposed tables in order to create supporting areas for the different body parts of the user.

Preferably the tables (13) with their protuberances (14) are slidably fitted onto the laying planes (7) and can be easily and quickly replaced with separately provided tables having protuberances (14) differently arranged in order to meet the support capacity values required by different users.

19 Claims, 3 Drawing Sheets

U.S. PATENT DOCUMENTS

| | | | | |
|---|---|---|---|---|
| 5,453,231 A | * | 9/1995 | Douglas | 264/45.8 |
| 6,086,802 A | | 7/2000 | Levera et al. | |
| 6,312,244 B1 | * | 11/2001 | Levera et al. | 425/4 C |
| 6,998,077 B2 | * | 2/2006 | Levera et al. | 264/51 |
| 7,326,040 B2 | * | 2/2008 | Levera et al. | 425/4 C |
| 7,604,761 B2 | * | 10/2009 | Abrigo et al. | 264/46.2 |
| 7,842,206 B2 | * | 11/2010 | Villa et al. | 264/45.8 |
| 2002/0025355 A1 | | 2/2002 | Lupke et al. | |
| 2003/0209827 A1 | * | 11/2003 | Levera et al. | 264/51 |
| 2006/0073229 A1 | * | 4/2006 | Levera et al. | 425/371 |

FOREIGN PATENT DOCUMENTS

| | | |
|---|---|---|
| EP | 0955144 A1 | 11/1999 |
| EP | 1025972 A1 | 8/2000 |
| EP | 1361033 A2 | 11/2003 |
| GB | 2246738 | 2/1992 |

* cited by examiner

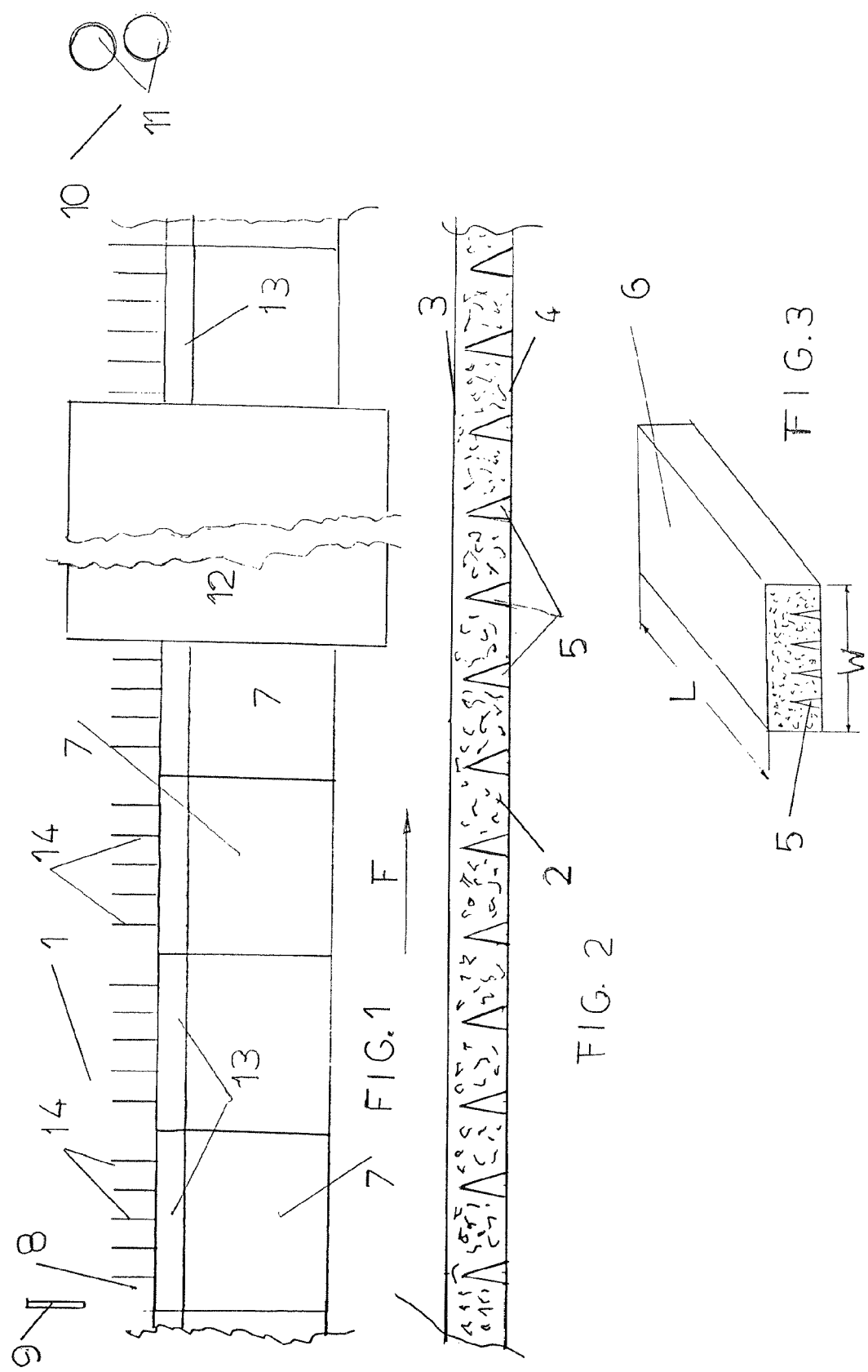

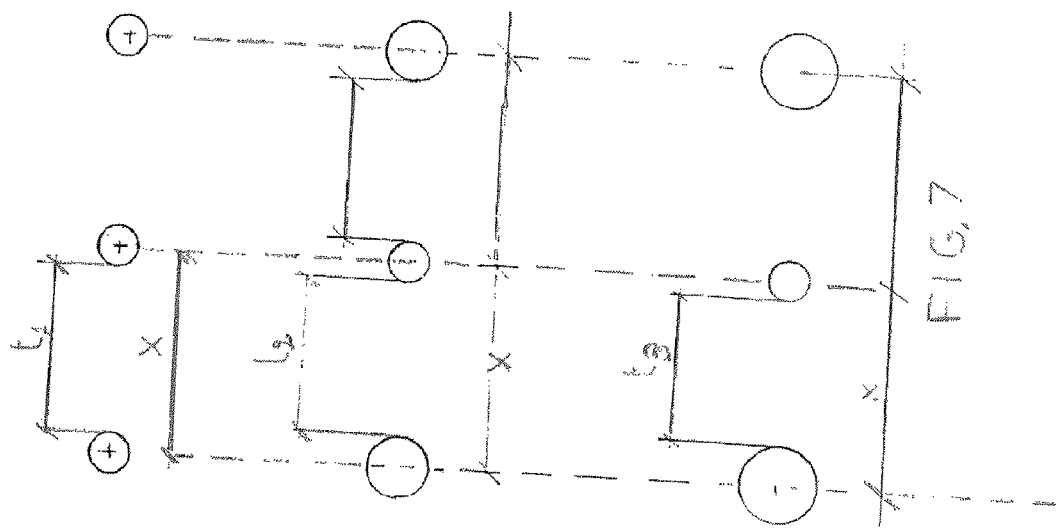
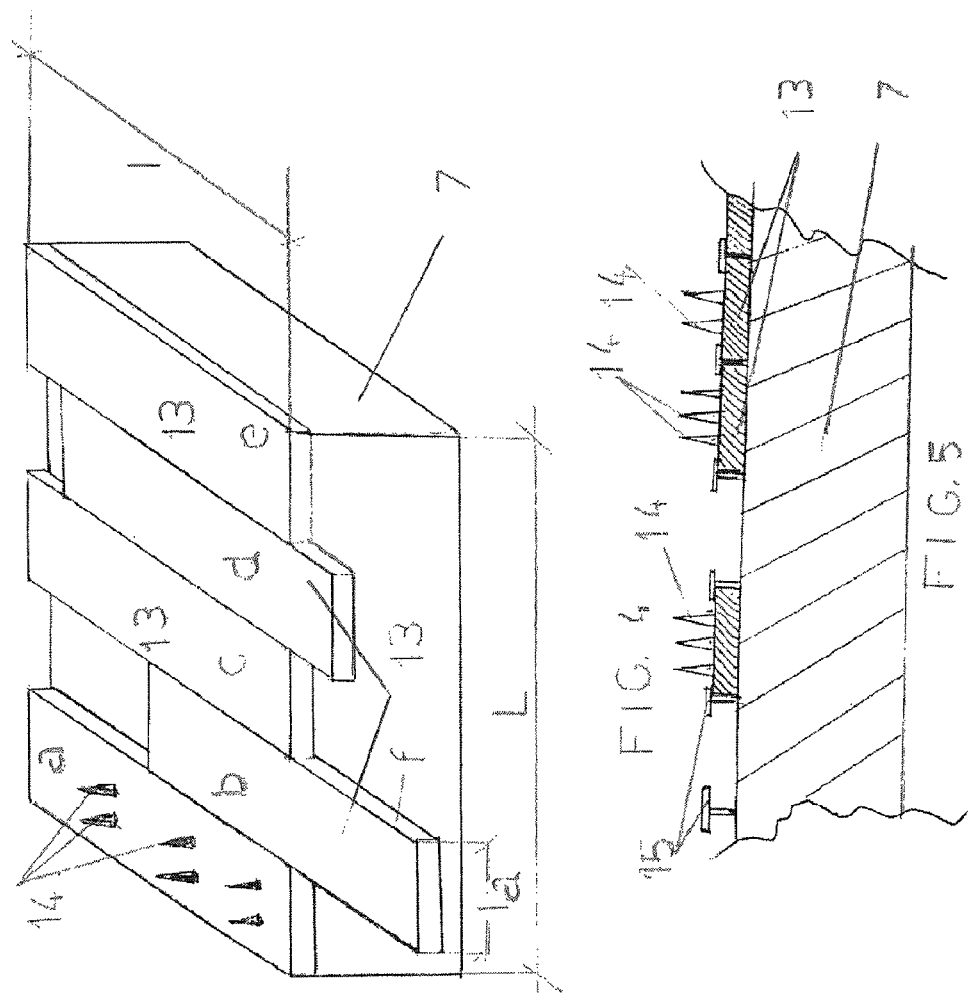

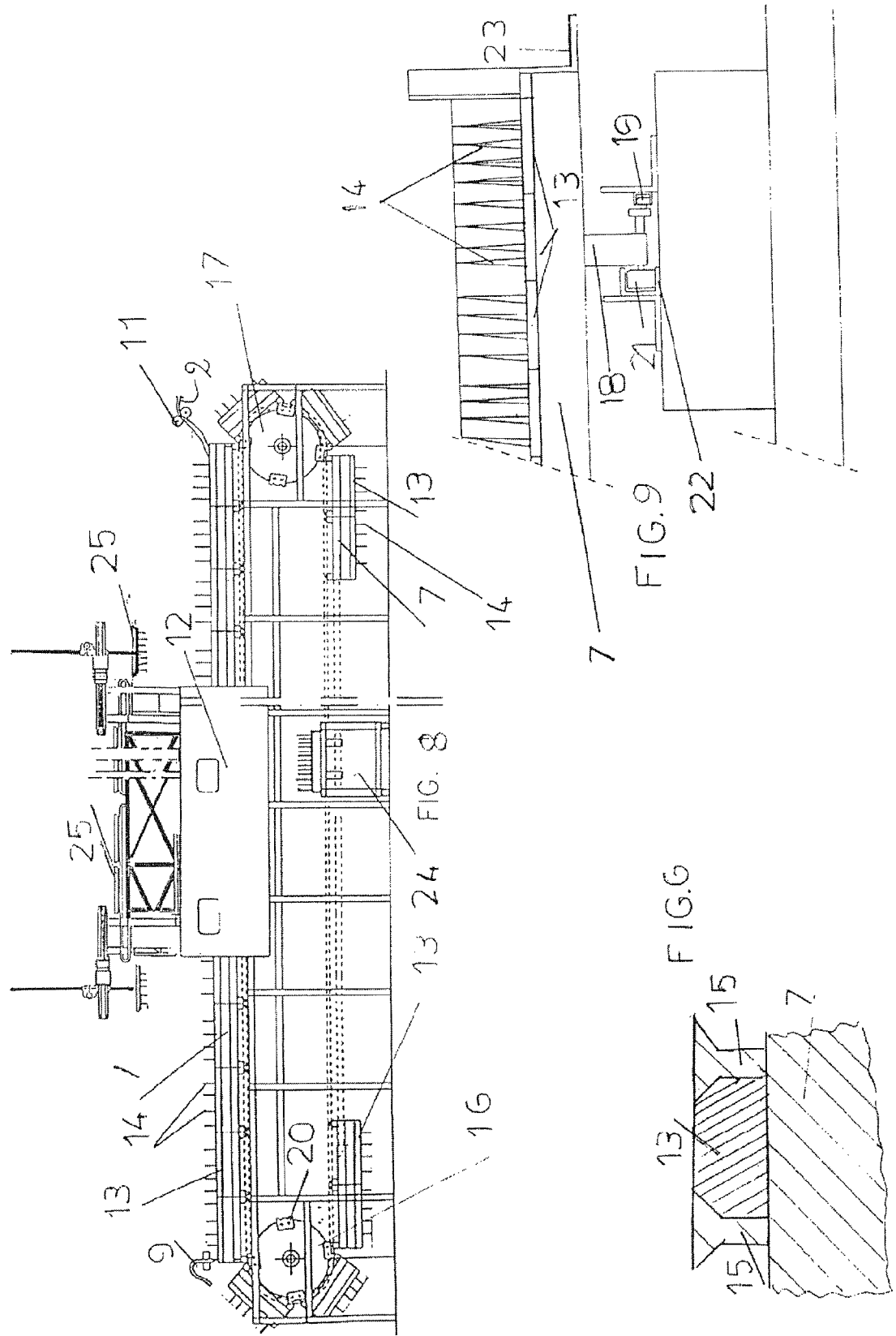

PLANT FOR CONTINUOUSLY MANUFACTURING A FOAM LAYER TO FORM REST ARTICLES

The present invention refers to a plant for continuously manufacturing a foam layer having undefined length; the layer is obtained by advancing a plurality of laying planes, on which foam has been deposited, along a predetermined direction.

The layer is divided into a plurality of rest articles by means of successive cross cuts.

Each laying plane is provided with a plurality of protuberances capable of forming cells into the layer.

Specifically, the continuous plant is suitable for manufacturing foam mattresses provided with cells.

European Patent EP0 955 144 discloses a continuous plant for continuously manufacturing latex foam articles.

For a better understanding of the invention, it must be said that, as known, the mattress comprises a plurality of portions adapted to support the different body parts of the user.

Generally a first portion is for head support, a second portion is for shoulders and back support, a third portion is for the loin region, a fourth portion is for the legs and a fifth portion is for the feet.

Each portion has a distinctive support capacity value, usually different, sometimes slightly different from the other portions.

As it is known, one of the comfort parameters is the support capacity of a foam mattress which depends on many factors such as sinking strength, compression strength and resilience.

The support capacity is the degree of reaction exerted by the mattress resilient material when it is subjected to the weight of the human body.

Substantially, it is to be noted that, the support capacity can be determined in many ways, for example by the reaction, measured in Newton, of a foam block when compressed at 40% of its rated thickness.

In order to provide users with the maximum comfort, standards, tables and proposals specifying support capacity values for the different parts of the mattress are known; however these values are often subjected to evaluations, studies, and surveys by organizations such as Universities or Clinical Departments which are sometimes required to verify which parts of the body are to be supported to the smallest or highest degree.

The customer may therefore require the manufacturer to customize the support capacity of different portions of the mattress and the manufacturer should follow and meet the customer requirements—often hospitals or great dealers of furniture and rest articles.

In short, a predetermined cell distribution suitable, for example, for a customer requiring the maximum support capacity in the head supporting area might be unsuitable for a customer requiring lower support capacity in the same area, therefore the mattress manufacturer has to vary both the distribution and the size of the protuberances needed to mould the head support portion.

European Patent EP 0 955 144 discloses a continuous plant for manufacturing latex foam mattresses having differentiated support capacity areas.

Such plant comprises a plurality of carriages moving along an annular pattern defined by a first upper branch between a foam injection station and a second mattress drawing station and by a lower branch for returning the carriages without foam to the injection station.

The total length of the plant may range from 25 to 50 meters and even more.

The carriages may range from 20 to 100 cm along the plant longitudinal size and 220 cm crosswise.

At any moment the upper branch is filled with carriages, the lower one by fewer carriages moving faster than those of the first branch.

Each carriage has an upper base, called laying plane, from which a plurality of overhanging protuberances, arranged according to a pattern and shape corresponding to the cell profile of the mattress, project.

The distribution of the protuberances on the laying plane is such that it provides amounts of foam having specific support capacities.

The handling of the lower branch carriages is performed by three conveyor belts each one with self speed.

The intermediate conveyor belt is arranged on transversally moving means in such a way that it is possible first to draw out one or more carriages from the plant in order to modify their size, then replace the modified carriages along the lower branch without interrupting the manufacturing cycle.

In this way it becomes possible to draw out one or more carriages no more suitable for the desired production cycle.

In short, the known solution would offer the opportunity of adjusting the plant to a new production cycle for a different product.

This solution may be adopted also to vary the protuberance shape, dimensions and/or heights of each carriage.

However, it is to be noted that all the many protuberances are deeply inserted into the laying plane of the carriage.

In the lower part, each protuberance comprises a thread necessary to engage with a corresponding female thread on the laying plane.

It is to be pointed out that the laying plane of each carriage may comprise a grid consisting of multiple horizontal and vertical rows of protuberances, in some cases over 350 protuberances, therefore any change in size and/or shape of a single carriage would require elaborate and very long procedures.

The problem of changing the protuberance distribution in order to meet the requirements of a new customer increases in that the known plant may comprise more than 40 carriages, each of which requires the abovementioned operations to vary the protuberance distribution.

When attempting to overcome the abovementioned drawbacks further problems may arise.

It is to be noted that in a continuous manufacturing method the processing parameters differ from the parameters of processes comprising a single mould steadily located in a fixed position.

In a continuous method, the carriages feeding speed and the step of laying the latex foam among the continuously moving protuberances, are processing parameters particularly relevant for the result to be achieved.

In short, the distribution of the continuously moving protuberances is a parameter affecting the good result of the end product.

According to what previously stated, it can be reasonably said that, in order to ensure an accurate manufacturing, the choice of a particular distribution of the protuberances for the various carriages is a regulating principle.

If the protuberances are too close to each other, the latex foam injected while the carriages are moving might not flow along the protuberance sides and might not reach the carriage bottom thus resulting in an end product whose structure will not be complete in all the portions meant in the beginning.

On the other hand, if the protuberances are too far from each other, heat transfer from the protuberances to the latex foam might not be enough for the gelation step to take place, as a result the foam will collapse and the end product will become chemically unstable and therefore unsatisfactory.

The phenomenons involved are rather complex depending on the above mentioned dynamic and geometric parameters as well as on the different components of the mixture such as surfactants, gelation agents and other agents known to one skilled in the art.

Therefore the question of differentiating a mattress support capacity in order to meet the requirements of different customers cannot be easily solved.

Therefore, when a mattress manufacturer, who has already attained and implemented a continuous method meeting all the desired requirements and has produced a first plurality of satisfactory articles, has to face elaborate procedures to insert and draw out many protuberances in a carriage board, it will not be induced to change the protuberance distribution in order to manufacture a second plurality of articles fearing to incur a method with different process parameters which have been changed to compensate for possible dangers or poor flow of the mixture among the protuberances or to avoid the latex foam collapse.

This is a matter of psychological and economic bars.

In order to overcome the abovementioned bars and to seek new solutions, change of the protuberance distribution should be made easy and feasible.

It is an object of the present invention a continuous plant for manufacturing a foam layer having undefined length to be divided into a plurality of rest articles which provides means for changing the protuberance distribution in a laying plane so as to conform the support capacity of different article portions to the requirements of individual users overcoming the disadvantages of the prior art.

Therefore it is an object of the present invention a plant for manufacturing a foam layer having undefined length comprising a plurality of laying planes provided with protuberances, said laying planes having predetermined width and length dimensions at right angles to each other along a same planar surface, said laying planes being continuously advanced with their width to the advancing direction from a foam laying station to a layer removing station and then to a cutting station, said continuous layer being cut into a sequence of rest articles, said layer being defined by two faces, at least one of which crossed by cells moulded by said protuberances, said plant being characterized in that:

it comprises at least one table provided with said protuberances which overlaps each laying plane, said at least one table at least partially covering the laying plane;

said at least one table provided with protuberances is fitted on each laying plane at least along one of said predetermined dimensions;

at least one table provided with protuberances is inactively arranged beside the plant and replaceable with said at least one table provided with protuberance of the plant.

Preferably the plant comprises a plurality of juxtaposed spaced tables to form a surface for the foam deposit, each table being provided with a protuberance distribution different from that of the juxtaposed tables, said tables being arranged along the width direction of the laying plane.

The tables are mounted on the laying planes, each of them, for example, by means of one setscrew or a pair of screws.

Preferably, said tables are slidably fitted on said laying plane.

Advantageously, the plant comprises guiding means for slidably fitting said tables onto said laying plane.

Favourably, said tables contact one another.

Typically, each table of a laying plane comprises a distribution and a number of protuberances able to form a foam portion corresponding to a specific supporting area for the user's body.

The present invention will be now further described in conjunction with the accompanying drawings, to be considered as illustrative and not restrictive, in which:

FIG. 1 is an outline of the plant of the present invention in a longitudinal view;

FIG. 2 is a cross section of the continuous layer manufactured using the plant of FIG. 1, in a longitudinal view;

FIG. 3 is a perspective view of a mattress obtained by consecutively cutting the layer of FIG. 2;

FIG. 4 is a perspective view of the characteristics of the invention in a member of the plant of FIG. 1;

FIG. 5 is a cross section of the member of FIG. 4;

FIG. 6 is a schematic view of guiding means between two members of plant 1;

FIG. 7 is a fragmentary view of some possible distributions of the moulding protuberances;

FIG. 8 is a longitudinal view of an alternative of the plant according to the invention;

FIG. 9 is a cross sectional view of a member of the plant of FIG. 7.

The plant 1 of FIG. 1 is adapted to manufacture a continuous latex foam layer 2 (FIG. 2) of unlimited length upwardly and downwardly defined by two faces 3, 4 respectively, at least the lower face being crossed by cells 5. The continuous layer 2 is then subjected to cross cuts transversal to its length; these are made at a predetermined distance in order to obtain single mattresses 6 (FIG. 3) defined by a width W lengthwise to layer 2 and by a length L according to the cutting direction.

To achieve this aim, the plant 1 comprises a plurality of side by side placed laying planes 7, continuously fed in the longitudinal direction F between a latex foam laying station 8 and a foam layer drawing station 10 provided with a pair of rolls 11 each rotating in opposing direction with the layer running in between.

The station 8 is provided with a laying device 9.

Between stations 8 and 10 is a latex foam gelation and vulcanizing device 12.

It is a novel feature of the plant 1 the overlapping of a plurality of side by side placed tables 13 on each laying plane 7 (FIG. 4).

The tables are made of many kinds of metals, preferably aluminium, with thicknesses ranging from 2 to 10 mm.

Each table 13 is provided with a plurality of upwardly cantilevered protuberances 14, preferably made of aluminium. The protuberances may be tapered and ended in a point or for instance they may be cylinder shaped with a circular connection on their top, or cylinder shaped at their base and tapered toward their top or anyway, of any shape to mould cells in the latex foam.

For a better understanding of the novel feature of the plant a fragmentary perspective view of FIG. 4 is used, wherein for sake of simplicity, only a table 13 is represented with protuberances 14 already arranged according to a predetermined distribution.

Herein below the term "distribution" means the relative distance between the axes and the protuberance walls as well as their number per square decimeter, that is the data which allows to define a specific grid comprising horizontal and vertical rows directed along the main dimensions of each table.

As can be clearly seen in FIG. 4, the several tables 13 can be slidably inserted and drawn on and from the laying plane 7 respectively.

It is to be noted that in the exemplary description, such tables 13 are slidably inserted and drawn along the plant longitudinal direction F; each table 13 has a length "l" along the plant longitudinal direction F, a width "$l_a$" transversal to "l" and sides "f".

Preferably the arrangement of all the tables 13 provided with protuberances 14 on each laying plane 7 covers an area corresponding to the area of a mattress 6 (FIG. 3). On the laying plane, all tables 13 make up an area having a total length "l", corresponding to the width "W" of the mattress 6, and a width "$nl_a$" which corresponds to length "L" of the mattress, wherein "n" is an integer between 4 and 9, preferably between 5 and 7.

The width of table 7, corresponding to the mattress length may be 220 cm.

Moreover the arrangement of all tables 13 provided with protuberances 14 on each laying plane 7 and the juxtaposed arrangement of all laying planes 7 with their respective tables 13 being continuously fed in the longitudinal direction F make up a continuous bed adapted to receive and support the layer 2.

A further characteristic of the plant according to the invention, consists of guiding means which allow tables 13 on the laying plane 7 to be slidably fitted along the longitudinal plant direction F.

Preferably such guiding means comprise members which longitudinally contact sides "f" and cover the edges of each table along direction "l".

According to an example, such guiding means consists of a pair of T-shaped beams 15 (FIG. 5) with each table 13 slidably fitted in between.

As can be seen in FIG. 5, tables 13 contact the leg of the T shape while the head of the T-shape is part of the laying bed of the latex layer.

According to other arrangements, the guiding means 15 (FIG. 6) can consist of pairs of countersunk-head beams, each with a table 13 in between having corresponding countersinks in its upper portion. Therefore, with this arrangement, the beam heads and the upper end portion of the tables are aligned thus making up a continuous laying bed for the latex.

In the arrangements, as shown in FIGS. 5, 6 and alike, the tables are placed side by side and in contact with each other.

Referring back to the description of tables 13, it is to be noted that each has a distribution of the protuberances 14 which may differ from the distribution of the juxtaposed tables in order to create afterwards areas having different support capacity as to the various body parts of the user.

It is therefore an advantage of the present invention the possibility of slidably inserting and/or drawing out from each laying plane 7 one or more tables 13, already prepared beside the plant 1, with a protuberance distribution specifically designed to mould a foam portion corresponding to a supporting zone of a user's body; all this bearing in mind to follow each time, with the same plant, the possible requirements of different customers or the changeable regulations imposed by the market.

In an exemplary embodiment, tables 13 are adapted to define five areas differentiated as for support capacity for a user's body. In other embodiments, these areas may be seven.

In the example relating to five areas, such tables are successively shown by letters a, b, c, d and e in FIG. 4.

Tables a, b, c, d, e together with protuberances 14 are adapted to form supporting areas for the following parts of the body:

Table "a" for the head, "b" for the back and shoulders, "c" for the loin region, "d" for the legs and "e" for the feet.

Advantageously the invention allows to automatically adapt the moulding means of the plant, that is the protuberances 14, designed to form the different supporting areas of the body.

For a better appreciation of the advantages of the invention, in order to comply with the requirements of a first customer, we suppose that a first continuous manufacturing cycle of mattresses 6 has been obtained after having determined specific support capacity values which may be different in different areas of a mattress. According to the manufacturing process of the first cycle, the protuberance distribution of table "c" is such that it creates the maximum support capacity, the protuberance distribution of tables "a", "e" creates support capacity values slightly lower and the protuberance distribution of the other tables creates even smaller values.

Moreover, we suppose now a second customer requires a second manufacturing process for a plurality of mattresses each having different supporting characteristics in different areas compared to the first cycle.

For example, the manufacturing process of the second cycle requires maximum support capacity values for the shoulders while for the head and feet it requires support capacity values lower than the example described before.

Yet before the first cycle ends, the novel characteristic of the present invention allows the arrangement of a series of tables 13 provided with protuberances 14 having a different distribution from the distribution adopted for the first cycle.

Then at the end of the first cycle, leaving unchanged the process parameters and particularly the latex mixture density injected onto the various laying planes, it is possible to start a second cycle once the drawing operations of the tables 13 from each laying plane 7 and the insertion, on such laying planes 7, of the new tables 13 comprising a protuberance distribution 14, capable of defining the support capacity characteristics required by the second user, have been carried out.

It is to be pointed out how the present invention allows to vary the support capacity of the mattresses without substituting, displacing or modifying the entire laying plane 7 but simply making use of quick and automated drawing and inserting operations of the light structures of the tables 13.

Preferably the plant according to the invention takes advantage of further characteristics which contribute to correctly form a plurality of rest articles having different support capacity without significantly departing from the manufacturing parameters even though tables 7 have been replaced, as previously described.

In the protuberance distribution the following distinctive characteristics have been adopted:

centre distance value "x" between two protuberances constant in each laying plane and for all laying planes;

protuberance diameter at the base ranging from 16 mm to 28 mm, preferably from 16 to 24 mm, more preferably a 20 mm diameter.

Preferably in the grid of each laying plane the centre distance value "x" is 40 mm in the protuberance row parallel to length "l" of each table and 43 mm in the perpendicular row.

Now some exemplary protuberance distributions are described with reference to the embodiment in FIG. 7, wherein along three horizontal rows the protuberance distributions relative to three tables interchangeable with one another, for example during three different manufacturing cycles, are shown.

Such examples focus on the preferred values interchangeable tables can have in order to achieve different support capacities while maintaining the manufacturing parameters of the initial latex mixture unchanged.

To make the description easier, reference will be made to the change of the table adapted to form a support for the user's head, in each laying plane.

The examples come as follows:

EXAMPLE 1

FIG. 7

A first plurality of tables "a" provides the following characteristics:

Diameter of two consecutive protuberances 16 mm.

Centre distance "x" between the same protuberances 40 mm.

Distance "$t_1$" between the sides of the same protuberances 24 mm.

A second plurality of tables "a", in replacement of the first plurality provides centre distance values "x" unchanged.

Diameter of two consecutive protuberances 20 and 16 mm respectively.

Distance "$t_2$" between the sides of the same protuberances 22 mm.

As can been seen, the second plurality of tables "a" has a lower distance between consecutive protuberances, therefore the amount of gaps in the user's head supporting portion will be greater than in the first plurality of tables.

Consequently replacing the first plurality of tables with the second plurality of tables will meet the requirements of a customer who needs a softer head support.

This condition is expressed by the apparent density values depending both on the starting mixture density and on the amount of air created by the cells; the existence of a greater amount of gaps due to bigger cells will determine a lower apparent density, therefore the apparent density of the cellular material beside the second plurality of tables will be lower than the apparent density beside the first plurality of tables.

EXAMPLE 2

FIG. 7

Once again the second plurality of tables, having the values mentioned in the first example, will be taken into consideration.

A third plurality of tables "a" interchangeable with the first provides a centre distance "x" unchanged and:

Diameter between two consecutive protuberances 24 and 16 mm respectively.

Distance "$t_3$" between the sides of the same protuberances 20 mm.

As it can be observed, by replacing the abovementioned tables it is possible to create a head supporting area even softer than using the second plurality of tables.

It is to be noted that the table replacement in the two examples mentioned before allows the starting mixture density to be kept unchanged, having density values ranging between 50-70 g/l while the apparent density may range from 30 to 60.

Now in FIG. 8 a more detailed embodiment of a preferred version of the plant according to the invention will be described.

In the following description, elements having the same function and construction bear the same numeral references as in the previous figures.

According to this alternative, the laying planes 7 of the plant 1 are represented by carriages on the upper base of which the tables 13 provided with protuberances 14 are slidably fitted.

The carriages 7, equipped with tables 13, move along an annular path comprising two toothed pulleys, a driving pulley 16 and a driven pulley 17.

A supporting block 18 (FIG. 9) at the base of each carriage supports some rollers 19 whose spindles engage the pulleys drive means 20.

The carriages 7 are pushed by the driving wheel to contact each other along the upper active branch wherein the tables 13 receive the latex foam, injected by means of device 9, among the protuberances 14.

The movement of carriages 7 along the annular path is carried out by sliding the rollers 19 and the wheels 21 along suitable guides 22 having a fixed structure.

The carriages of the lower branch can be fewer than the carriages in the upper branch and with this arrangement they move by means of moving means, such as conveyors and alike, independent from the driving pulley, at a speed higher than the upper branch.

In the return branch, the carriages rest on the conveyors by means of side flanges 23.

Advantageously, the above mentioned moving characteristics of the carriages 7 and their speed in the lower branch allow the use of an apparatus 24 on the upper surface of which various tables 13 provided with protuberances 14, adapted to replace the tables placed on the carriages, can be arranged.

Therefore when a support capacity different from that obtainable in the various sections of the layer 2 are required, the apparatus 24 can be brought closer between the two conveyors of the lower branch, then drawing the tables 13 on the laying planes and replacing them with tables 13 lying on the apparatus 24.

Going back to the description of the plant 1, attention is drawn to means for making upper cells in the layer 2. To this end, the upper portion of the plant comprises a plurality of plates 25, each provided with a plurality of protuberances 26 adapted to form the upper cells.

Plates 25 move along an annular path wherein the lower section is the active part passing through the gelation and vulcanizing device 12.

This part of the plant is not further described as it corresponds to what already known from the European patent EP1361033 to which, for any further explanation, reference is made.

The invention claimed is:

1. Plant for manufacturing a continuous foam layer of undefined length comprising:
   a plurality of laying planes;
   a plurality of metal tables provided with metal protuberances,
   said laying planes having predetermined first and second length dimensions at right angles to each other along a same planar surface,
   said laying planes for continuously advancing with the laying plane first length dimension oriented in an advancing direction (F) from a foam laying station to a layer removing station and then to a cutting station, with said tables having said protuberances, as upwardly cantilevered protuberances, forming a surface for depositing the foam from the foam laying station,
   said cutting station for cutting said continuous foam layer along the predetermined second length dimension transverse to the advancing direction (F) into a sequence of rest articles wherein the rest articles are mattresses with recesses,
   said foam layer being defined by two faces, at least one of which crossed by cells moulded by said protuberances, the tables provided with said protuberances overlapped to each laying plane and at least partially covering the laying plane;

the tables provided with said protuberances are removably fitted on each laying plane at least along one of said predetermined first and second length dimensions to be removable from the laying plane which the respective table overlaps wherein the plurality of tables comprises spaced juxtaposed side by side placed tables forming a surface for foam deposit, wherein a first said table of said plurality of side by side tables having a protuberance distribution different from that of a second said table juxtaposed placed side by side to said first table, and wherein said tables are slidably removably fitted on the laying plane.

2. Plant according to claim 1, wherein the plurality of tables comprises spaced juxtaposed side by side placed tables forming a surface for foam deposit, each table of said plurality of juxtaposed side by side tables having a protuberance distribution different from that of the table placed side by side to said table, said tables being arranged along the first length dimension of the laying plane.

3. Plant according to claim 1, wherein each laying plane comprises guiding means for slidably removably fitting said tables on said laying plane.

4. Plant according to claim 1, wherein said tables contact each other.

5. Plant according to claim 2, wherein the protuberances have sides and each protuberance has a respective circular base having a diameter, wherein each table comprises a distribution of protuberances for forming a foam portion having a specific support capacity adapted for a specific area of the rest article, said distribution of protuberances corresponding to a grid where along the length and perpendicular to the length of each table each protuberance has a center and a diameter and two consecutives protuberances have a center distance and a side wall distance.

6. Plant according to claim 5, wherein at least one laying plane comprises a plurality of juxtaposed tables wherein the centre distance "x" between consecutive protuberances is constant.

7. Plant according to claim 5, wherein the protuberances have sides and each protuberance has a respective circular base having a diameter, wherein at least one laying plane comprises at least a first table having centre distance and the distance between the sides of two consecutive protuberances of predetermined values "x" and "$t_1$" respectively, said at least a first table being replaceable with a second table having a distance "$t_2$" between consecutive protuberances, said first and second tables having a centre distance value "x" unchanged and a distance "$t_2$"<"$t_1$" between the sides of two consecutive protuberances.

8. Plant according to claim 5, wherein the protuberances have sides, wherein at least one of said tables of a laying plane comprises a constant centre distance value "x" between consecutive protuberances and distance values between the sides of consecutive protuberances ranging from 18 to 24 mm.

9. Plant according to claim 1, wherein said laying planes are carriages on the base surface of which at least one said table provided with protuberances is removably fitted, said carriages being moved along an annular path comprising two branches—respectively an upper and lower branch, radiused around two pulleys, a driving pulley and a driven pulley respectively, the upper branch carriages being brought in contact with each other by the thrust applied by said driving pulley, the lower branch carriages being fewer in number than the upper branch carriages and being driven independently from the upper branch carriages and at a higher speed.

10. Plant according to claim 9, wherein said tables provided with protuberances are slidably removable from at least one carriage and replaceable onto said at least one carriage with tables provided with protuberances arranged beside the plant at said lower branch.

11. Plant according to claim 1, wherein said foam is a latex foam.

12. Plant according to claim 1, wherein each laying plane comprises guiding means for slidably fitting said tables on said laying plane, said guiding means comprising a pair of T-shaped beams and each table is slidably fitted between a pair of said T-shaped beams.

13. Plant according to claim 1, wherein each laying plane comprises guiding means for slidably fitting said tables on said laying plane, said guiding means comprising a pair of countersunk head beams and each table is slidably fitted between a pair of said countersunk head beams.

14. Plant according to claim 1, wherein said laying planes are carriages on the base surface of which at least one said table provided with protuberances is slidably removably fitted, said carriages being moved along an annular path comprising two branches—respectively an upper and lower branch, radiused around two pulleys, a driving pulley and a driven pulley respectively, the upper branch carriages being brought in contact with each other by the thrust applied by said driving pulley, a supporting block attached to a base of each carriage and supporting rollers;

the protuberances upwardly directed along the upper branch of the path.

15. Apparatus comprising the plant according to claim 14, further comprising at least one other table provided with protuberances inactively arranged away from any said annular path and replaceable with at least one said table provided with protuberances of the plant.

16. Apparatus comprising the plant according to claim 1, multiple juxtaposed tables overlap each said laying plane.

17. Apparatus comprising the plant according to claim 1, further comprising at least one other table provided with protuberances inactively arranged away from any said laying plane and replaceable with at least one said table provided with protuberances of the plant.

18. Plant according to claim 5, wherein said tables are adapted to define from 4 to 9 foam portions having differentiated specific support capacity adapted for respective specific areas of the rest article.

19. Plant according to claim 1, wherein the first length dimension equals a width of the rest article to be cut at the cutting station from the continuous foam layer and the second length dimension equals a length of the rest article to be cut at the cutting station from the continuous foam layer, the rest article being a mattress, wherein said tables are adapted to define from 5 to 7 foam portions having differentiated specific support capacity adapted for respective specific areas of the rest article.

* * * * *